(12) United States Patent
DeSena et al.

(10) Patent No.: US 7,946,550 B2
(45) Date of Patent: May 24, 2011

(54) CONCEALMENT DEVICE

(76) Inventors: Thomas E. DeSena, Boca Raton, FL (US); Donald W. Johnson, San Antonio, TX (US)

( * ) Notice: Subject to any disclaimer, the term of this patent is extended or adjusted under 35 U.S.C. 154(b) by 259 days.

(21) Appl. No.: 12/070,821

(22) Filed: Feb. 21, 2008

(65) Prior Publication Data

US 2009/0211181 A1    Aug. 27, 2009

(51) Int. Cl.
*E04G 3/00*   (2006.01)
(52) U.S. Cl. .................. 248/291.1; 248/220.21
(58) Field of Classification Search ............. 248/220.21, 248/220.22, 223.41, 225.11, 225.21, 304, 248/339, 301, 489
See application file for complete search history.

(56) References Cited

U.S. PATENT DOCUMENTS

| | | | |
|---|---|---|---|
| 2002/0033436 A1* | 3/2002 | Peng et al. | 248/284.1 |
| 2006/0266900 A1* | 11/2006 | May et al. | 248/220.22 |
| 2009/0050775 A1* | 2/2009 | Constantinou et al. | 248/489 |

* cited by examiner

*Primary Examiner* — Terrell McKinnon
*Assistant Examiner* — Erin Smith
(74) *Attorney, Agent, or Firm* — Christopher L. Makay

(57) ABSTRACT

A device for concealing a space between an object and a planar surface includes a first interlocking strip and a second interlocking strip engageable with the first interlocking strip. The first and second interlocking strips move relative to each other such that they span the space between the object and the planar-surface. The first and second interlocking strips are movable linearly, angularly, and vertically to achieve concealment of the space between the object and the planar surface.

15 Claims, 10 Drawing Sheets

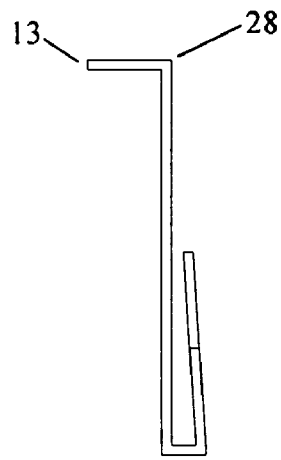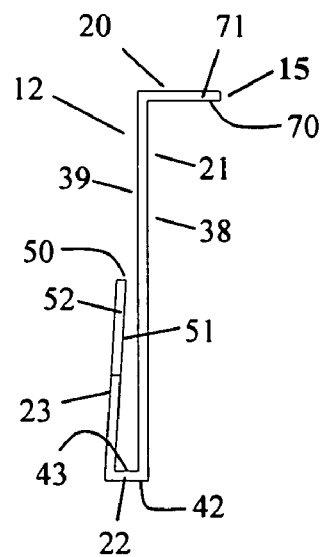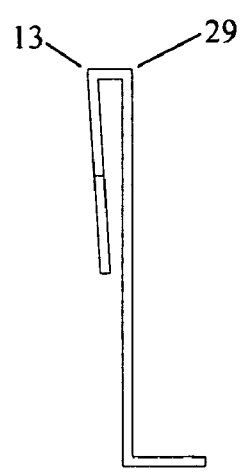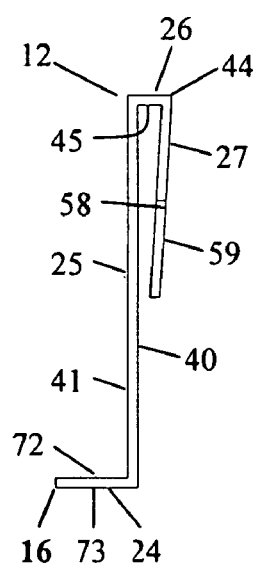
Fig 4B
Fig 4A

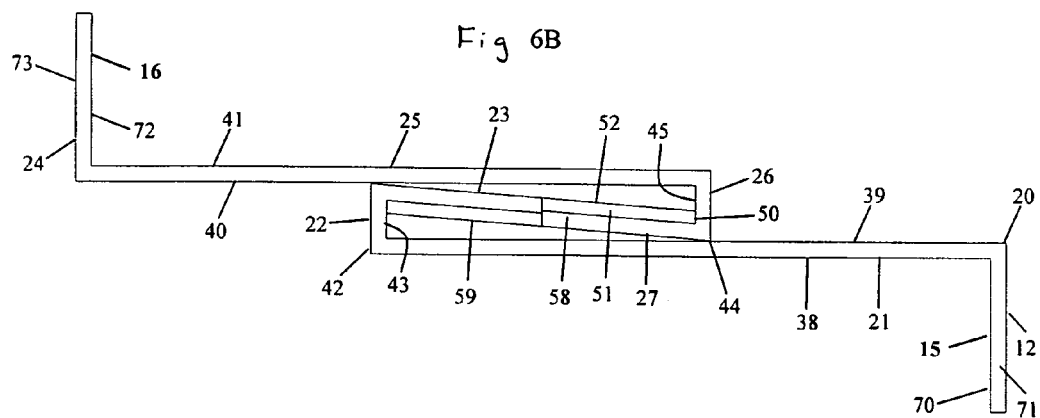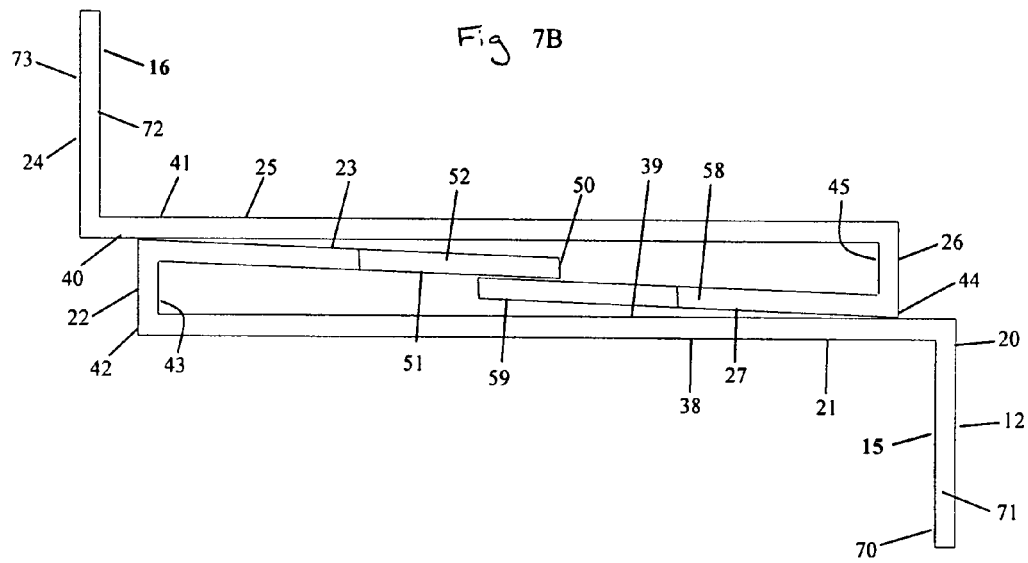

CONCEALMENT DEVICE

BACKGROUND OF THE INVENTION

1. Field of the Invention

The present invention relates to the concealment of objects, and, more particularly, but not by way of limitation to a concealment device employed in the fields of cable management, concealment, and audio/visual equipment mounting. Specifically, the present invention provides a method and apparatus for concealing the cables and mounting hardware of wall mounted flat panel devices.

2. Description of the Related Art

Devices such as the "Tria Wall Mount System" by Omni-Mount are available to conceal the wiring of a wall mounted flat panel television as the wires run along the wall. The problem with such devices is that they do not conceal the wires as they extend from the wall to the television nor do they conceal the wall mount. Other devices such as the Chief "In-wall Accessory" conceal portions of the wall mounting equipment, however these devices do not fully conceal the mount as it extends from the wall to the television and do not conceal the wires. The "DFK Decorative Frame" by Chief Manufacturing conceals the cables and wall mount of a flat panel television by building a rectangular frame around the edges of the television. The problem with this device is that the television must be mounted essentially parallel to the wall (i.e. the frame cannot accommodate any significant tilt in the orientation of the television) and the frame requires precision cutting and fitting because it must closely fit the front or sides of the television.

The present invention solves the problem of the current state of the art by concealing cables as they extend from the wall to the wall mounted device, concealing the wall mount, and accommodating tilted panels without requiring precision cutting or fitting.

SUMMARY OF THE INVENTION

The device according to the present invention is designed to conceal a space between an object and a planar surface. The device includes a first interlocking strip and a second interlocking strip engageable with the first interlocking strip. In the preferred embodiment, the first and second interlocking strips are held together by friction. The frictionally joined first and second interlocking strips are adjustable linearly, vertically, and angularly to facilitate the spanning of the space between the object and the planar surface.

The first and second interlocking strips each include a mounting flange, a concealment panel, an end panel, and a friction panel. The concealment panel is substantially perpendicular to the mounting flange, while the end panel is substantially perpendicular to the concealment panel. Further, the end panel resides in a direction opposite to the mounting flange. The friction panel connects with the end panel and is angled towards the concealment panel.

The first and second interlocking strips engage through the insertion of the friction panel for the second interlocking strip between the concealment panel and friction panel of the first interlocking strip. The friction panel and the concealment panel of the first interlocking strip frictionally engage the friction panel of the second interlocking strip. Likewise, the friction panel for the first interlocking strip inserts between the concealment panel and friction panel of the second interlocking strip. The friction panel and the concealment panel of the second interlocking strip frictionally engage the friction panel of the first interlocking strip.

The mounting flanges of the first and second interlocking strips allow the device to mount to the planar surface and abut the object. Spanning the space between the object and the planar surface is achieved through the adjustment of friction panels relative to each other. Linear adjustment is achieved by moving the friction panel of the second interlocking strip linearly relative to the friction panel and the concealment panel of the first interlocking strip. Vertical adjustment is achieved by moving the friction panel of the second interlocking strip vertically relative to the friction panel and the concealment panel of the first interlocking strip. Angular positioning is achieved by moving an edge of the friction panel for the second interlocking strip linearly relative to an edge of the friction panel of the first interlocking strip while an opposite edge of the friction panel for the second interlocking strip remains substantially stationary relative to an opposite edge of the friction panel for the first interlocking strip. Once properly adjusted, the concealment panels of the first and second interlocking strips span and thus conceal the space between planar surface and the object.

BRIEF DESCRIPTIONS OF DRAWINGS

FIG. 4A is an end view of the interlocking strips which make up the concealment device.

FIG. 4B is an end view of the interlocking strips which make up the concealment device.

FIG. 6B is an end view of the interlocking strips showing the maximum linear distance between the mounting flanges

FIG. 7B is an end view of the interlocking strips showing the minimum linear distance between the mounting flanges.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps. The present invention can be used to conceal wires between a wall and any surface, however for purposes of explanation the present invention will be described in terms of concealing wires between a wall and flat-panel television.

Figure 1:
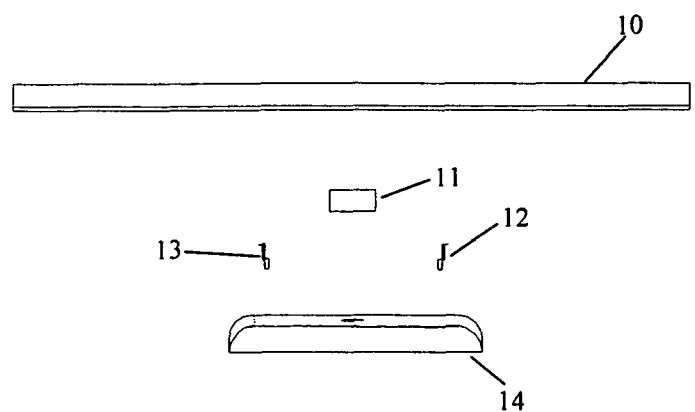
FIG. 1 is an assembly view showing a concealment device according to the preferred embodiment in combination with a wall and an adjacent flat-panel device.
Figure 2:
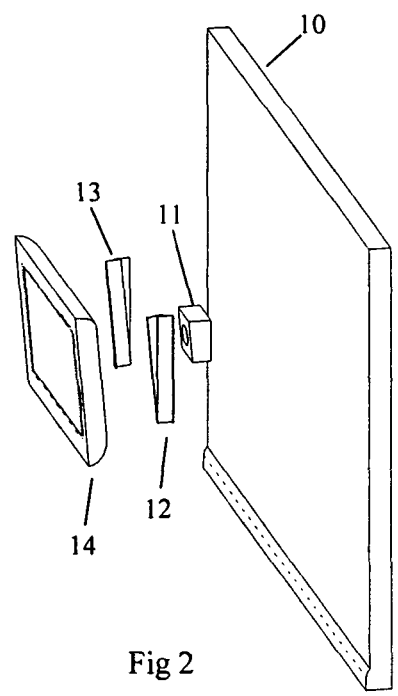
FIG. 2 is an isometric view showing a concealment device according to the preferred embodiment in combination with a wall and an adjacent flat-panel device.

FIGS. 1 and 2 show the general arrangement of the invention. FIG. 1 illustrates a top view of the components of the invention as well as an object requiring concealment, in this case the wall mount 11 and the wires of a flat-panel television 14. FIG. 2 illustrates an isometric view of the components of the invention. Referring to FIG. 1 there is shown the concealment devices 12 and 13 that make up the preferred embodiment of the invention. In a typical assembly there will be a wall 10, a wall mount 11, a flat panel television 14, and concealment devices 12 and 13.

Figure 3:
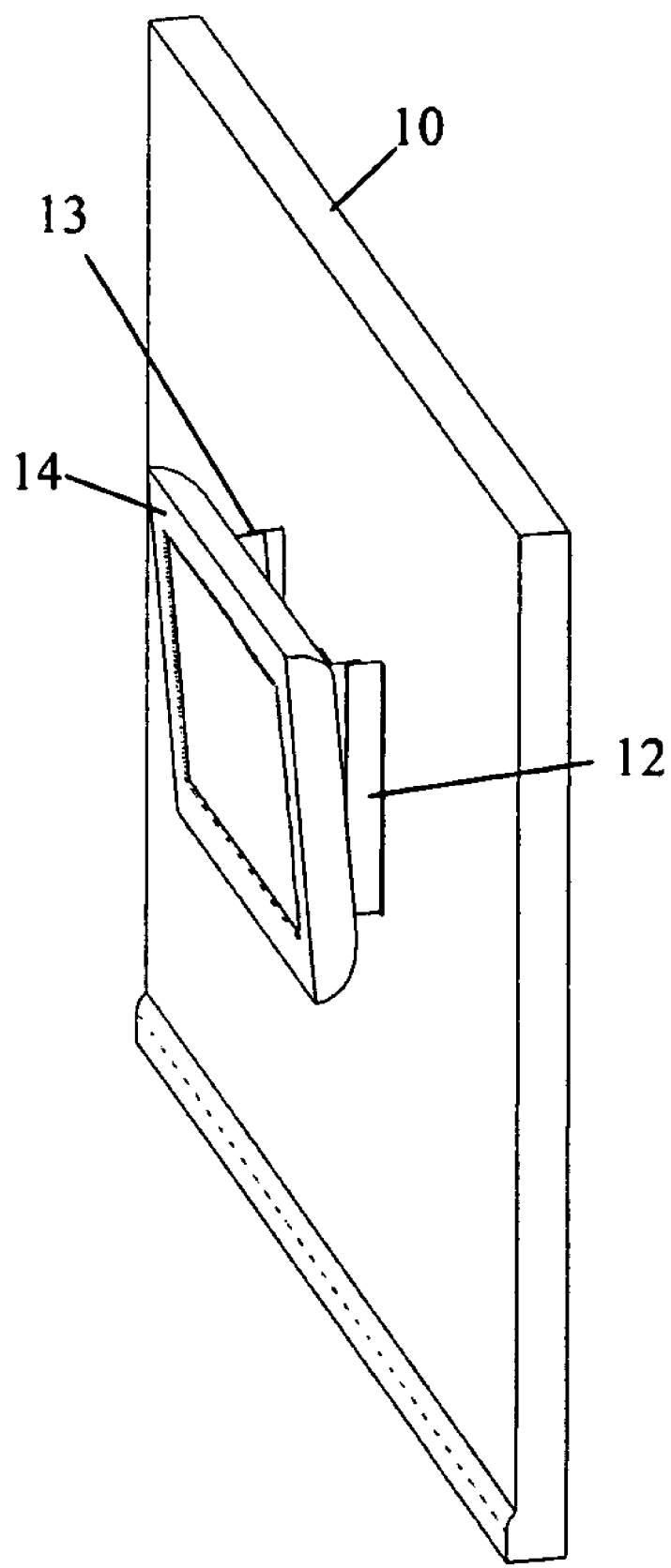
FIG. 3 is an isometric view of the concealment device, assembled in combination with the wall and the adjacent flat-panel device.

Referring to FIG. 3 there is shown the preferred embodiment of the present invention after it has been assembled. The wall mount 11 is mounted onto the wall 10; thereafter the flat-panel television 14 will be attached to the wall mount 11. The concealment devices 12 and 13 will be placed between the wall 10 and the flat-panel television 14 in order to conceal the wall mount 11 and any wires that extend from the wall 10 to the flat-panel television 14. The concealment devices 12 and 13 will be mounted to the wall 10, using any means suitable in the art such as screws or double-sided tape. The concealment devices 12 and 13 will then be extended so that they reach flat-panel television 14. The concealment devices 12 and 13 can be mounted to the flat-panel television 14 using any means common in the art or they can be left un-mounted having friction hold them in place. In the alternative, this process can be reversed having the concealment devices 12 and 13 mounted to the flat-panel television 14 using any means common in the art, and then extended to the wall 10.

FIGS. 4A and 4B illustrate the components that make up the concealment devices 12 and 13. Concealment devices 12 and 13 consist of 4 interlocking strips 15, 16, 28 and 29. In this preferred embodiment of the present invention the interlocking strips 15, 16, 28 and 29 are identical, this is beneficial in the manufacture of the invention in that only one piece needs to be manufactured. However, it should be noted that the interlocking strips 15, 16, 28, and 29 can be manufactured in different sizes in order to meet a particular job requirement. The interlocking strips 15, 16, 28, and 29, which make up concealment devices 12 and 13, can be made of molded plastic, metal, or any other material suitable in the art. In the alternative the interlocking strips 15, 16, 28, and 29 can be assembled from separate individual parts. In order to assemble the concealment devices 12 and 13, the interlocking strips 15, 16, 28, and 29 are oriented as mirror images of each other. The assembly of concealment devices 12 and 13 are explained in greater detail below.

The concealment device 12 consists of two interlocking strips 15 and 16. The interlocking strip 15 consists of, a mounting flange 20, a concealment panel 21, an end panel 22, a friction panel 23, a first edge 80, and a second edge 81. The interlocking strip 16 consists of; a mounting flange 24, a concealment panel 25, an end panel 26, a friction panel 27, a first edge 82, and a second edge 83.

The mounting flange 20 of the interlocking strip 15 consists of an inside surface 70 and an outside surface 71. The mounting flange 24 of the interlocking strip 16 consists of an inside surface 72 and an outside surface 73. The outside surface 71 of interlocking strip 15 and the outside surface 73 of interlocking strip 16 allows the interlocking strip 15 and 16 to attach to flat surfaces, in this case either a wall 10 or a flat-panel television 14. This can be accomplished by any suitable means such as a screws or an adhesive such as Velcro or double sided tape. In the preferred embodiment the mounting flange 20 and 24 are oriented perpendicular to the concealment panel 21. However, if so desired the mounting flange 20 and 24 could be angled relative to the concealment panel 21 and the concealment panel 25 thereby allowing the angled mounting of the concealment device 12.

The interlocking strip 15 contains a concealment panel 21 and an end panel 22. The concealment panel 21 consists of an observable surface 38 and a non-observable surface 39. The concealment panel 21 is substantially perpendicular to the mounting flange 20 and prevents the wall mount 11 and any wires from being observed by a person. The observable surface 38 of the concealment panel 21, faces away from the wall mount 11 and is observable by a person. The non-observable surface 39 of the concealment panel 21 faces towards the wall mount 11 and any wires or cables, and is not observable by a person when the concealment device 12 is assembled and mounted. The end panel 22 of interlocking strip 15 consists of an outside surface 42 and an inside surface 43. The end panel 22 is oriented so that it is perpendicular to the concealment panel 21.

The interlocking strip 16 contains a concealment panel 25 and an end panel 26. The concealment panel 25 consists of an observable surface 40 and a non-observable surface 41. The concealment panel 25 is substantially perpendicular to the mounting flange 24 and prevents the wall mount 11 and any wires from being observed by a person. The observable surface 40 of the concealment panel 25, faces away from the wall mount 11 and is observable by a person. The non-observable surface 41 of the concealment panel 25 faces towards the wall mount 11 and any wires or cables, and is not observable by a person when the concealment device 12 is assembled and mounted. The end panel 26 of interlocking strip 16 consists of an outside surface 44 and an inside surface 45. The end panel 26 is oriented so that it is perpendicular to the concealment panel 25.

Figure 5A:
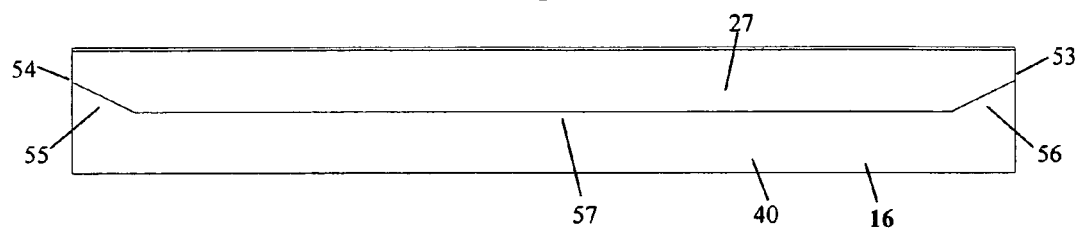
FIG. 5A is a side view of the interlocking strip showing the detail of the chamfered edges.
Figure 5B:
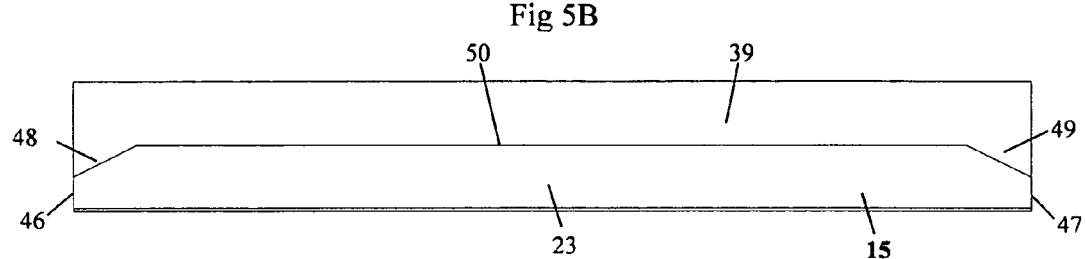
FIG. 5B is a side view of the interlocking strip showing the detail of the chamfered edges.

FIGS. 4A, 5A, 5B illustrate the friction panel 23 and the friction panel 27 of interlocking strip 15 and 16. The friction panel 23 of interlocking strip 15 is angled relative to end panel 22 and towards non-observable surface 39 of concealment panel 21. The friction panel 23 of interlocking strip 15 consists of an inside surface 51 an outside surface 52, sides 46 and 47, chamfered edges 48 and 49, and a flat edge 50. The inside surface 51 of friction panel 23 faces towards the non-observable surface 39 of the concealment panel 21. The outside surface 52 of friction panel 23 faces away from the concealment panel 21. As illustrated in FIG. 5 the friction panel 23 consists of a flat edge 50, chamfered edges 48 and 49, and sides 46 and 47. The flat edge 50 of the friction panel 23 does not run completely across the friction panel 23 rather the flat edge terminates in chamfered edges 48 and 49 which are angled downward towards the sides 46 and 47.

The friction panel 27 of interlocking strip 16 is angled relative to end panel 26 and towards observable surface 40 of concealment panel 25. The friction panel 27 of interlocking strip 16 consists of an inside surface 58 an outside surface 59, sides 53 and 54, chamfered edges 55 and 56, and a flat edge 57. The inside surface 58 of friction panel 27 faces towards the observable surface 40 of the concealment panel 25. The outside surface 59 of friction panel 27 faces away from the concealment panel 25. As illustrated in FIG. 5 the friction panel 27 consists of a flat edge 57, chamfered edges 55 and 56, and sides 53 and 54. The flat edge 57 of the friction panel 27 does not run completely across the friction panel 27 rather the flat edge 57 terminates in chamfered edges 55 and 56 which are angled downward towards the sides 53 and 54. The benefits of this design will be discussed in greater detail below.

Figure 6A:
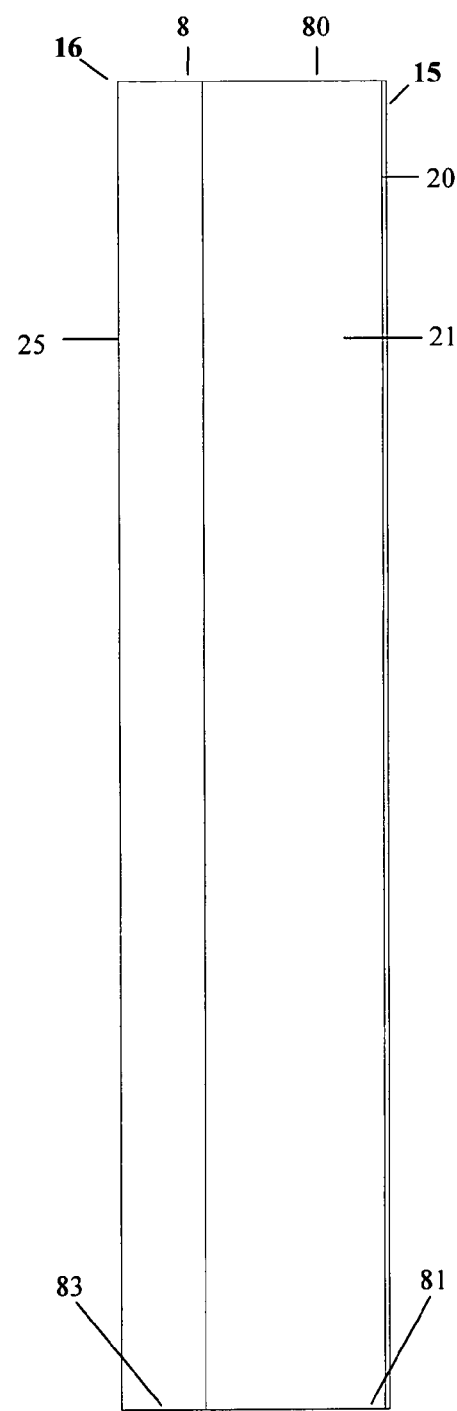
FIG. 6A is a side view of the interlocking strips showing the maximum linear distance between the mounting flanges.

FIGS. 6A, 6B, 7A and 7B illustrate how interlocking strips 15 and 16 fit together. In order to accommodate different distances between a wall 10 and a flat panel television 14, the present invention is adjustable. This adjustability comes from the interlocking design. FIGS. 6A and 6B illustrate how the maximum distance can be achieved between mating edge 20 and mating edge 24.

In order to create the maximum linear distance between mounting flange 20 and the mounting flange 24 the friction panel 23 of interlocking strip 15 is positioned between the friction panel 27 and the concealment panel 25 of interlocking strip 16. The friction panel 23 is positioned so that the flat edge 50 is touching the inside surface 45 of the end panel 26. Likewise, the friction panel 27 of interlocking strip 16 is positioned between the friction panel 23 and the concealment panel 21 of interlocking strip 15. The friction panel 27 is also positioned so that the flat edge 56 is touching the inside surface 43 of the end panel 22. The inside surface 51 and 58 of the friction panel 22 and 27 will be mated together. As shown in FIG. 6, part of the outside surface 52 and 59 of the friction panel 23 and 27 will be mated against the non-observable edge 39 and the observable edge 40 of the concealment panel 21 and 25. This mating of surfaces will force the interlocking strip 15 and the interlocking strip 16 to fit tightly together so that friction holds them in place.

Figure 7A:
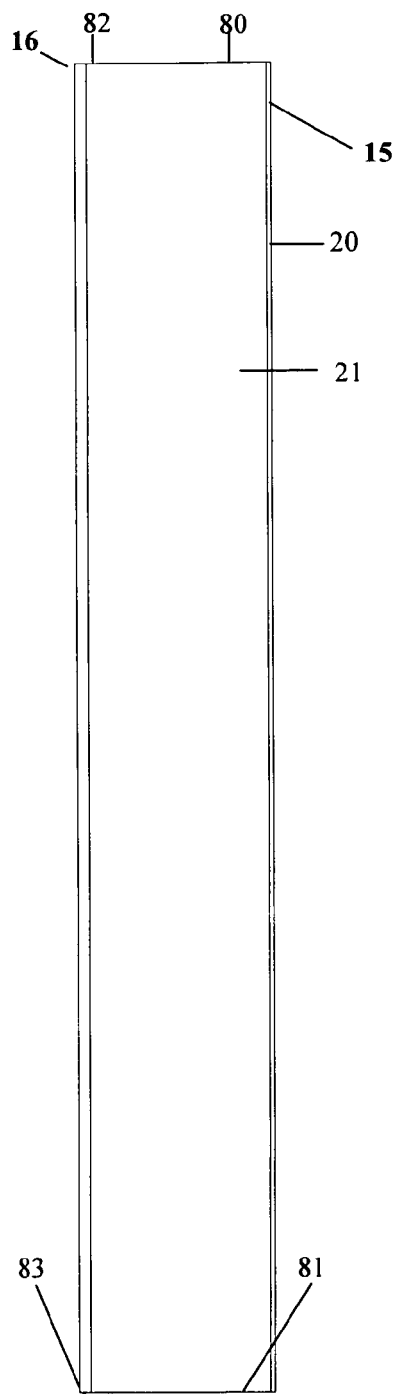
FIG. 7A is a side view of the interlocking strips showing the minimum linear distance between the mounting flanges.

As mentioned above the interlocking strips 15 and 16 can slide towards each other or apart so that the width of the shape formed by the interlocking strips 15 and 16 can be adjusted. FIGS. 7A and 7B illustrate how the minimum linear distance can be achieved between the mounting flange 20, and the mounting flange 24. In order to achieve the minimum linear distance between mounting flange 20, and the mounting flange 24, the friction panel 23 of interlocking strip 15 is positioned between the friction panel 27 and the concealment panel 25 of interlocking strip 16. However, unlike in FIGS. 6A and 6B, the friction panel 23 is not positioned so that the flat edge 50 is touching the inside surface 45 of the end panel 26. Rather the friction panel 23 is pulled until just before the frictional forces that hold interlocking panel 15 and 16 together are no longer present. As in FIG. 6 the surfaces of the friction panels 23 and 27 and the concealment panel 21 and 25 will be mated together, creating friction which will hold the interlocking strip 15 and 16 in place. The assembly of concealment device 13 will be identical to concealment device 12, the only difference being that interlocking panels 28 and 29 will be oriented in opposite directions to interlocking panels 15 and 16.

As mentioned above, the sliding motion of the interlocking strips 15 and 16 is not constrained in either planar direction so the shape formed by sliding the interlocking strips 15 and 16 can be rectangular or trapezoidal. This allows the concealment device 12 and the concealment device 13 to mount to angled surfaces and also to be arranged in a step configuration.

Figure 8:
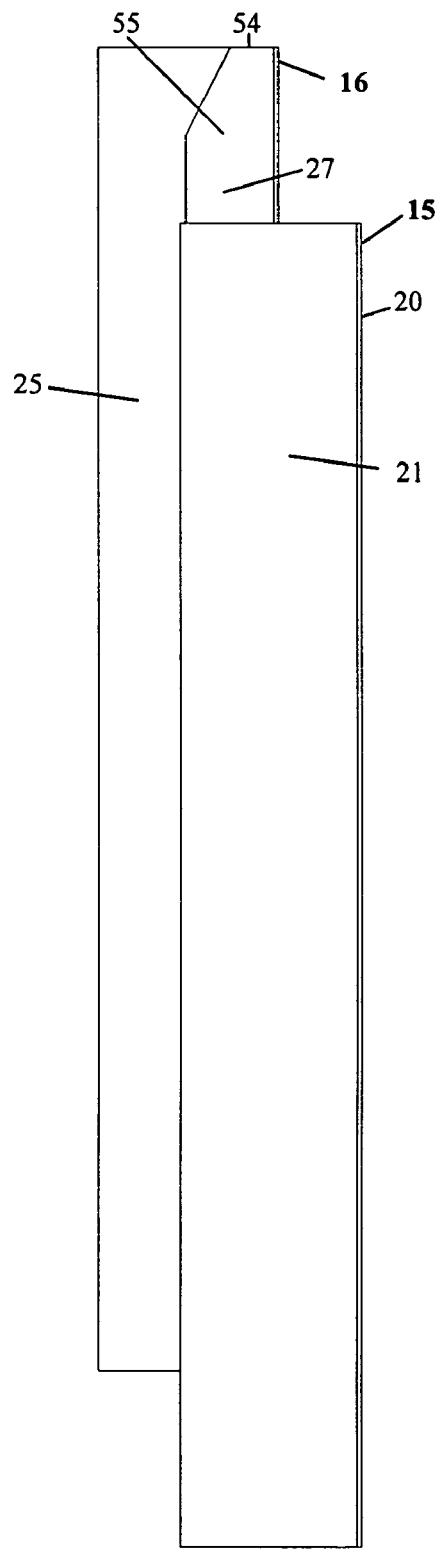
FIG. 8 is a side view of the interlocking strips showing them in a step configuration.

FIG. 8 illustrates how the interlocking design of concealment device 12 and 13 allow the interlocking strip 15, 16, 28 and 29 to slid relative to each other and form a step configuration. In forming a step configuration interlocking strip 15 and interlocking strip 16 are slid in opposite directions relative to each other. In doing so the friction panel 27 of interlocking strip 16 is exposed to an observer. It should be noted that if an end user does not desire to expose the friction panel 27 to an observer, the portion of the friction panel 27 that is exposed to the observer can be removed. The assembly of concealment device 13 will be identical to concealment device 12, the only difference being that interlocking panels 28 and 29 will be oriented in opposite directions to interlocking panels 15 and 16.

Figure 9A:
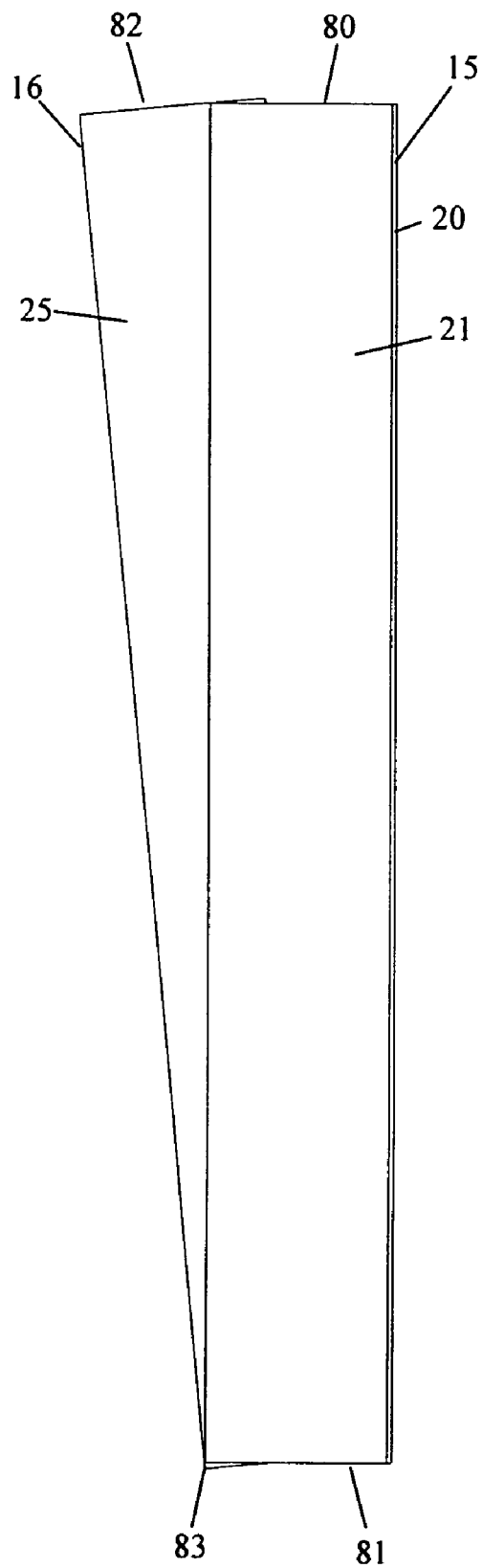
FIG. 9A is a side view of the interlocking strips showing the interlocking strips at maximum angular distance.
Figure 9B:
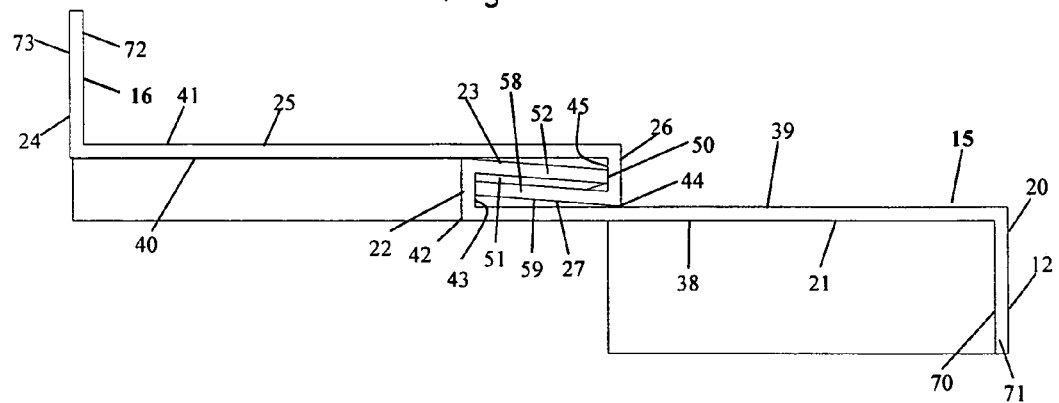
FIG. 9B is an end view of the top of interlocking strips, which are angled at the maximum angular distance; the view shows the strips at maximum linear distance between the mounting flanges.
Figure 9C:
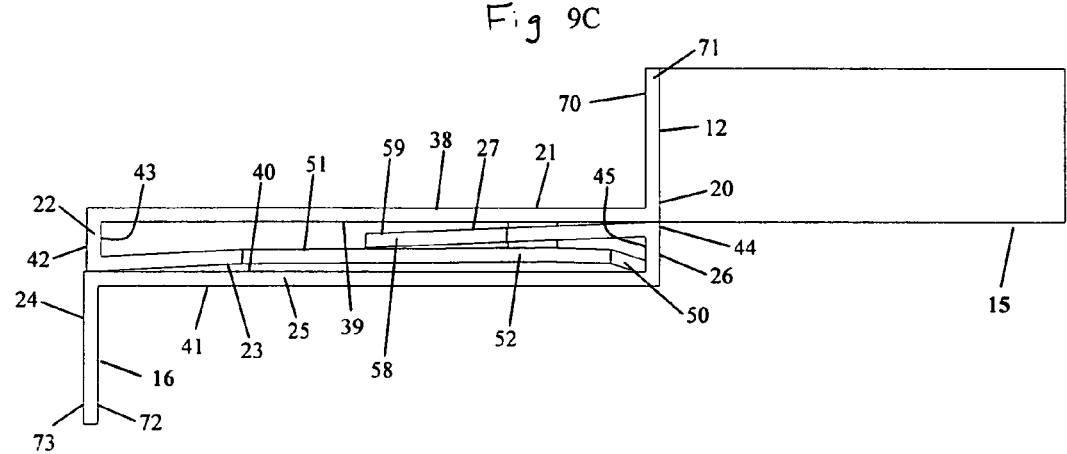
FIG. 9C is an end view of the bottom of interlocking strips, which are angled at the maximum angular distance; the view shows the strips at minimum linear distance between the mounting flanges.
Figure 10:
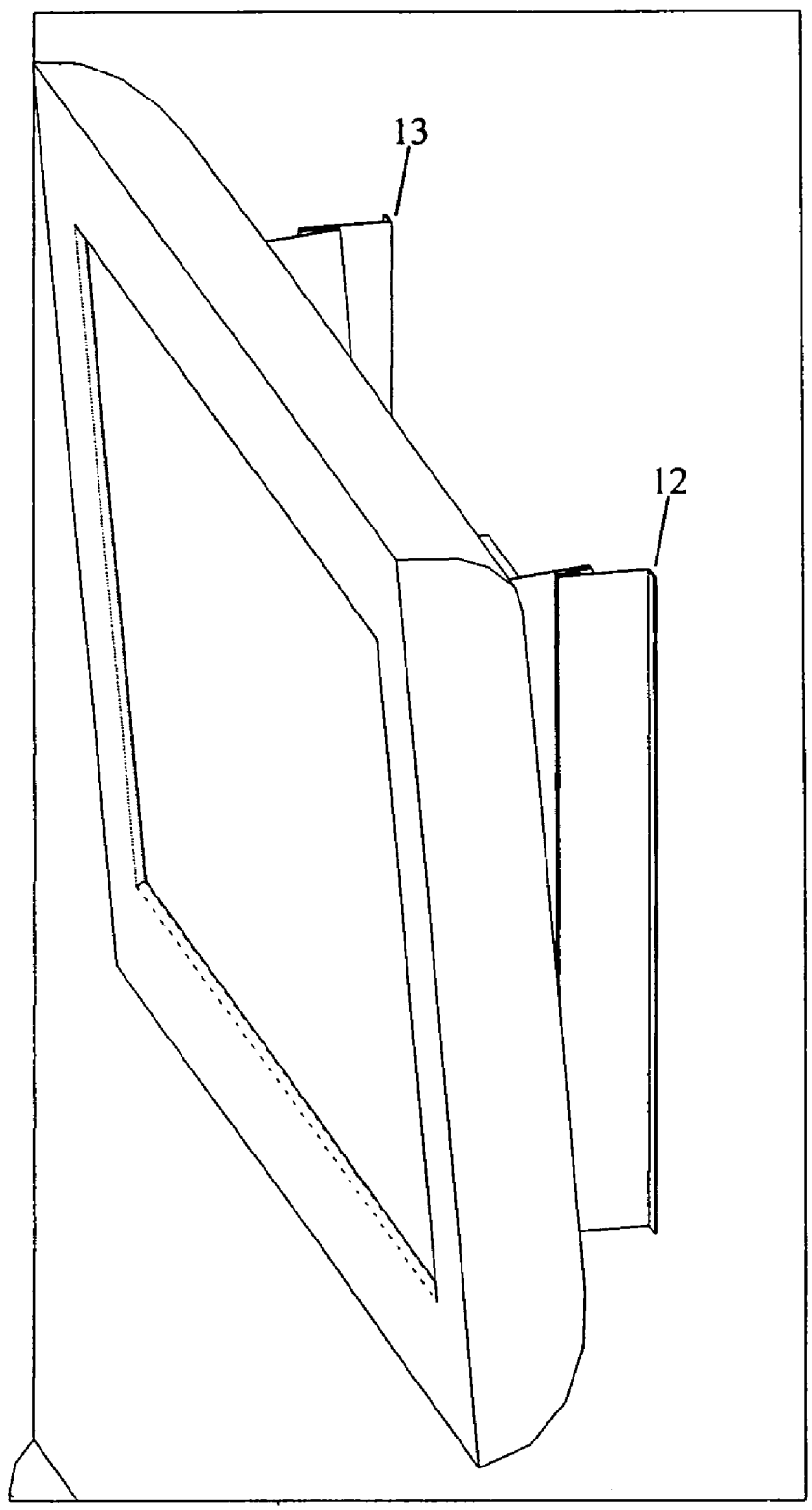
FIG. 10 is an isometric view of the interlocking strips which are angled at the maximum linear distance in combination with a wall and an adjacent flat-panel device.

FIGS. 9A, 9B, 9C and 10 illustrate how the interlocking design of concealment device 12 and 13 allow interlocking panel 15 and 16 to form a trapezoidal shape. As mentioned above the interlocking panel 15 and 16 contain chamfered edges 47, 48, 55, and 56. The chamfered edges allow the interlocking panel 15 and 16 to move angularly relative to each other, and in turn allow the concealment device 12 and 13 to mount to angled surfaces. In should be noted that FIG. 9 and FIG. 10 show the concealment device 12 and concealment device 13 mounting to surfaces that are angled downward, however if desired the concealment device 12 and 13 could be mounted to surfaces that are angled upward.

FIG. 9A shows how the maximum angular distance can be achieved between interlocking strip 15 and interlocking strip 16. In order to achieve the maximum angular distance the second edge 81 of the interlocking strip 15 and the second edge 83 of the interlocking strip 16 will be positioned so that the mounting flange 20 of interlocking panel 15 and the mounting flange 24 of interlocking panel 16 are placed at the minimum linear distance, this was described above and shown in FIGS. 7A, 7B and illustrated in FIG. 9C. Conversely, the first edge 80 of the interlocking strip 15 and the first edge 82 of the interlocking strip 16 will be positioned so that the mounting flange 20 of interlocking panel 15 and the mounting panel 24 are at their maximum linear distance this was also described above and shown in FIGS. 6A, 6B and illustrated in FIG. 9B.

The angle between interlocking panel 15 and interlocking panel 16 can be adjusted. This is achieved changing the position of the mounting flange 20 and the mounting flange 24 at the first edge 80 and first edge 82 of the interlocking strip 15 and 16. The second edge 81 of the interlocking strip 15 and the second edge 83 of the interlocking strip 16 stay substantially stationary while the angle of the first interlocking strip 15 and the second interlocking strip 16 are adjusted. In order to change the angle between interlocking strip 15 and interlocking strip 16, the mounting flange 20 at the first edge 80 of the interlocking strip 15 and the mounting flange 24 at the first edge 82 of the interlocking strip 16 slide towards each other or apart and towards either their maximum or minimum linear distance.

Although the present invention has been described in terms of the foregoing preferred embodiments, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

We claim:

1. A device for concealing a space between audio/visual equipment and a planar surface created by a mount secured to the audio/visual equipment and to the planar surface, comprising:
 a first interlocking strip comprising a concealment panel; and
 a second interlocking strip comprising a concealment panel, wherein the second interlocking strip is engagable with the first interlocking strip and movable relative thereto such that a width of the device formed through the engagement of the first interlocking strip and the second interlocking strip is adjustable between a minimum width and a maximum width, further wherein movement of the second interlocking strip relative to the first interlocking strip sizes the width of the device to the width of a space between the audio/visual equipment and the planar-surface such that the device spans the space and the concealment panels of the first and second interlocking strips conceal the mount.

2. The device of claim 1, wherein the first interlocking strip and the second interlocking strip are held together through frictional engagement.

3. The device of claim 1, wherein the second interlocking strip is linearly movable relative to the first interlocking strip to facilitate spanning of the space between an object and the planar-surface.

4. The device of claim 1, wherein the second interlocking strip is angularly positionable relative to the first interlocking strip to facilitate spanning of the space between an object and the planar-surface.

5. The device of claim 1, wherein the second interlocking strip is movable vertically relative to the first interlocking strip to facilitate spanning of the space between an object and the planar-surface.

6. The device of claim 4, wherein angular positioning of the second interlocking strip relative to the first interlocking strip is achieved by moving an edge of the second interlocking strip linearly relative to an edge of the first interlocking strip while an opposite edge of the second interlocking strip remains substantially stationary relative to an opposite edge of the first interlocking strip.

7. The device of claim 1, wherein the first and second interlocking strips each comprise:
   a mount flange, wherein the concealment panel is substantially perpendicular to the mounting flange;
   an end panel substantially perpendicular to the concealment panel, wherein the end panel is opposite in direction to the mounting flange; and
   a friction panel angled relative to the end panel and towards the concealment panel.

8. The device of claim 7, wherein the friction panel of the second interlocking strip inserts between the concealment panel and the friction panel of the first interlocking strip such that the friction panel and the concealment panel of the first interlocking strip frictionally engage the friction panel of the second interlocking strip.

9. The device of claim 8, further wherein the friction panel of the first interlocking strip inserts between the concealment panel and the friction panel of the second interlocking strip such that the friction panel and the concealment panel of the second interlocking strip frictionally engage the friction panel of the first interlocking strip.

10. The device of claim 9, wherein linear movement of the friction panel of the second interlocking strip relative to the friction panel and the concealment panel of the first interlocking strip facilitates spanning of the space between an object and the planar-surface.

11. The device of claim 9, wherein angular positioning of the second interlocking strip relative to the first interlocking strip is achieved by moving an edge of the friction panel for the second interlocking strip linearly relative to an edge of the friction panel for the first interlocking strip while an opposite edge of the friction panel for second interlocking strip remains substantially stationary relative to an opposite edge of the friction panel for the first interlocking strip.

12. The device of claim 11, wherein the edges of the friction panels for the first and second interlocking strips are chamfered to facilitate angular positioning of the second interlocking strip relative to the first interlocking strip.

13. The device of claim 9, wherein vertical movement of the friction panel of the second interlocking strip relative to the friction panel and the concealment panel of the first interlocking strip facilitates spanning of the space between an object and the planar-surface.

14. The device of claim 7, wherein the mounting flange of the first interlocking strip is mountable to the planar surface.

15. The device of claim 7, wherein the mounting flange of the second interlocking strip is mountable to the object.

\* \* \* \* \*